Jan. 26, 1943. J. L. RUPP 2,309,331
VENT PLUG FOR STORAGE BATTERIES
Filed April 8, 1940

Inventor
John L. Rupp
By John E. Stryker Jr.
Attorney

Patented Jan. 26, 1943

2,309,331

UNITED STATES PATENT OFFICE 2,309,331

VENT PLUG FOR STORAGE BATTERIES

John L. Rupp, Lancaster, N. Y., assignor to National Battery Company, St. Paul, Minn., a corporation of Delaware Application April 8, 1940, Serial No. 328,501

3 Claims. (Cl. 136—179)

It is an object of this invention to guard against explosions of the gases within a storage battery by providing novel means for so screening the vent passage that the highly explosive gases within the battery cannot be ignited when an explosion occurs outside of the battery.

A particular object is to provide a battery vent plug with a granular screen or body of aggregate adapted to diffuse and cool explosive gases sufficiently to prevent interior explosions and the resulting destruction of the battery. The invention also includes construction whereby the granular material or aggregate is excluded from reaching the interior of the cell.

Referring to the accompanying drawing.

Figure 1:
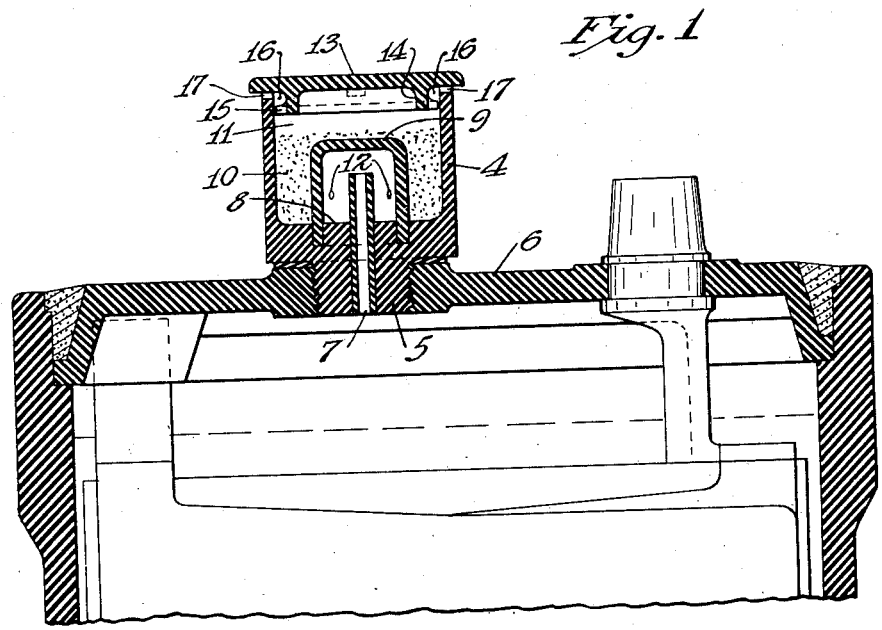
Figure 1 is a central vertical section through my improved vent plug, together with adjacent portions of a battery of common type.
Figure 2:
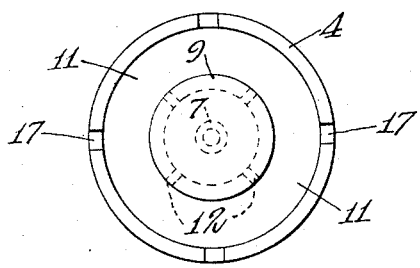
Fig. 2 is a plan view of the plug with its cover and the aggregate omitted.
Figure 3:
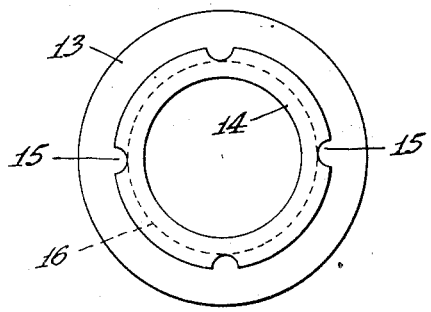
Fig. 3 is a bottom plan view of the vent cover.

My improved vent plug has a hollow cylindrical body portion 4 formed with a threaded neck 5 adapted to fit in a threaded opening in a battery cover 6. The connections between the vent plug and cover 6 and between the latter and the battery container are sealed in the usual or any suitable manner. Extending axially within the neck 5 and projecting into the cylindrical body 4 is a vent tube 7. This tube projects a substantial distance above the bottom 8 of the body 4 and its open, upper end is enclosed within a cylindrical cap 9 which is preferably removable and has a snug fit in an annular recess concentric with and spaced from the tube 7. A body of aggregate 10, such as sand, is placed around the cap 9. Below the surface of the aggregate a number of radial openings 12 are formed in the walls of the cap 9 to communicate with a chamber 11 containing the body of aggregate 10. The openings 12 are spaced upward from the bottom 8 and are of such size that the aggregate cannot enter the cap 9. A vent plug cover 13 is provided with a pendant annular flange 14 which fits snugly in the top of the chamber 11. This cover is vented by a series of recesses 15 and an annular groove 16 formed in the periphery of the flange 14, and adapted to communicate with the exterior of the plug through recesses 17 in the upper edge of the body 4.

Ordinary sand of suitable mesh or chips or particles of a metal, such as lead, which is not attacked by the electrolyte of the battery may be used as the aggregate 10. When the vent plug is in use gases from the battery pass through the tube 7 into the cap 9 and thence through the openings 12, into the body of aggregate 10 and then out from above the aggregate through the recesses 15 and 16. When an explosion occurs outside of the battery a small amount of gas in the top of the chamber 11 may be ignited but this does no harm as the cover 13 is free to move to open position. Due to the diffusing and cooling effect of the body of aggregate 10 the flame cannot follow through this body into the cap 9 or interior of the battery.

A body of aggregate located as herein described has the advantage over a liquid seal for the vent plug in that the aggregate cannot be drawn into the battery by the suction created when the gases within the battery cool after being heated under changing conditions of operation. If a small amount of the aggregate should enter the cap 9 through the openings 12 it is so trapped therein that it cannot reach the interior of the battery.

Having described my invention, what I claim as new and desire to protect by Letters Patent is:

1. In a vent plug for a battery container, a receptacle containing a body of aggregate, a vent tube communicating with the interior of the battery container and having a discharge end projecting centrally and upwardly within said receptacle and a cap spaced from said end and having pendant walls extending below the discharge end of said tube within the body of aggregate and formed with a plurality of openings for distributing gas from the tube beneath the upper surface of said body, said cap excluding the aggregate from said tube.

2. In a vent plug for a battery container having a cover, a receptacle mounted on said cover and containing a body of aggregate, a vent tube communicating with the interior of the container to be vented and having a discharge end projecting within said receptacle and a baffle member spaced from said end and having downwardly extending walls projecting below the discharge end of said tube for distributing gas from said tube beneath the upper surface of said body, said member excluding the aggregate from said tube and said walls being formed with perforations communicating with said body at a multiplicity of points spaced below the discharge end of said tube and above the bottom of said receptacle.

3. In a vent plug for a battery container having a cover, a cylindrical receptacle containing a body of aggregate and adapted to be mounted on said cover, a vent tube communicating with the interior of the battery container and having a discharge end projecting axially within said receptacle and a baffle member covering said end in spaced relation thereto and having annular, downwardly extending walls projecting below said discharge end of the tube and arranged to distribute gas from said tube beneath the upper surface of said body, said member having openings communicating with said body at points spaced upward from the bottom of said member and excluding the aggregate from said tube.

JOHN L. RUPP.